United States Patent
Shinomiya et al.

(10) Patent No.: US 8,957,144 B2
(45) Date of Patent: Feb. 17, 2015

(54) POLYCARBONATE RESIN COMPOSITION

(71) Applicant: Styron Europe GmbH, Horgen (CH)

(72) Inventors: Tadashi Shinomiya, Osaka (JP); Keiko Sakaguchi, Hyogo (JP)

(73) Assignee: Styron Europe GmbH, Horgen (CH)

( * ) Notice: Subject to any disclaimer, the term of this patent is extended or adjusted under 35 U.S.C. 154(b) by 0 days.

(21) Appl. No.: 14/133,686

(22) Filed: Dec. 19, 2013

(65) Prior Publication Data

US 2014/0107262 A1  Apr. 17, 2014

Related U.S. Application Data

(63) Continuation of application No. PCT/JP2012/057302, filed on Mar. 22, 2012.

(30) Foreign Application Priority Data

| Jun. 28, 2011 | (JP) | ................................. | 2011-142757 |
| Oct. 18, 2011 | (JP) | ................................. | 2011-228619 |
| Nov. 29, 2011 | (JP) | ................................. | 2011-259670 |

(51) Int. Cl.
*C08K 5/526* (2006.01)
*C08L 69/00* (2006.01)
*C08K 5/1525* (2006.01)
*C08K 5/52* (2006.01)
*C08K 5/53* (2006.01)
*C08L 25/12* (2006.01)
*C08K 5/5393* (2006.01)

(52) U.S. Cl.
CPC .............. *C08L 69/00* (2013.01); *C08K 5/1525* (2013.01); *C08K 5/52* (2013.01); *C08K 5/53* (2013.01); *C08L 25/12* (2013.01); *C08K 5/526* (2013.01); *C08K 5/5393* (2013.01)
USPC .......................................... 524/151; 524/133

(58) Field of Classification Search
USPC ................................................. 524/133, 151
See application file for complete search history.

(56) References Cited

U.S. PATENT DOCUMENTS

| 2,465,319 A | 3/1949 | Whinfield |
| 3,028,365 A | 4/1962 | Hermann |
| 3,047,539 A | 7/1962 | Pengilly |
| 3,169,121 A | 2/1965 | Goldberg |
| 3,419,634 A | 12/1968 | Vaughn, Jr. |
| 3,431,224 A | 3/1969 | Goldblum |
| 3,756,986 A | 9/1973 | Russell |
| 4,156,069 A | 5/1979 | Kesten et al. |
| 4,260,731 A | 4/1981 | Mori et al. |
| 4,401,804 A | 8/1983 | Wooten et al. |
| 4,529,791 A | 7/1985 | Glass |
| 4,532,290 A | 7/1985 | Jaquiss et al. |
| 4,677,162 A | 6/1987 | Grigo et al. |
| 4,888,388 A | 12/1989 | Hongo et al. |
| 4,963,619 A | 10/1990 | Wittmann et al. |
| 5,087,663 A | 2/1992 | Laughner |
| 5,124,402 A | 6/1992 | Laughner et al. |
| 5,189,091 A | 2/1993 | Laughner |
| 5,262,476 A | 11/1993 | Laughner |
| 5,369,154 A | 11/1994 | Laughner |
| 5,461,092 A | 10/1995 | Laughner |
| 5,922,816 A | 7/1999 | Hamilton |
| 5,981,661 A | 11/1999 | Liao |
| 6,727,301 B1 | 4/2004 | Eckel et al. |
| 6,767,943 B1 | 7/2004 | Eckel et al. |
| 7,223,812 B2 | 5/2007 | Seidel et al. |
| 7,645,850 B2 | 1/2010 | Freitag |
| 2005/0085589 A1 | 4/2005 | Kim |
| 2007/0155857 A1 | 7/2007 | Lee et al. |
| 2008/0090961 A1 | 4/2008 | Li et al. |
| 2009/0198010 A1 | 8/2009 | Eckel et al. |
| 2010/0204390 A1 | 8/2010 | Hayata |

FOREIGN PATENT DOCUMENTS

| EP | 2377899 A1 | 10/2011 |
| JP | 1266166 A | 10/1989 |
| JP | 6107939 A | 4/1994 |
| JP | 2002/069285 A | 3/2002 |
| JP | 2004/110345 | 8/2004 |
| JP | 2004/225212 A | 8/2004 |
| JP | 2002/225283 A | 8/2008 |
| WO | 92/03504 A1 | 3/1992 |
| WO | 2008/127286 A2 | 10/2008 |
| WO | 2011/128119 A1 | 10/2011 |
| WO | 2011/130754 A1 | 10/2011 |
| WO | 2013/017395 A1 | 2/2013 |

OTHER PUBLICATIONS

Search Report for International application No. PCT/JP2012/057302 dated Jun. 26, 2012.
Yanagase et at, Silicone-Based Impact Modifiers for Poly(vinyl chloride), Engineering Resins, and Blends, Journal of Polymer Science: Part A: Polymer Chemistry, 2004, 1112-1119, Vol, 42, Wiley Periodicals, Inc.

*Primary Examiner* — Peter Szekely

(57) ABSTRACT

A polycarbonate resin composition having improved chemical resistance and solvent resistance while maintaining the impact resistance, heat resistance, thermal stability, and the like inherent to the polycarbonate resin which comprises 100 parts by weight of polycarbonate resin and 0.01 to 20 parts by weight of a specific alkyl ketene dimer, and inhibits problems such as cracking, and the like, even when solvents or various chemicals such as hand creams and detergents adhere to the molded article obtained from the resin composition.

6 Claims, 1 Drawing Sheet

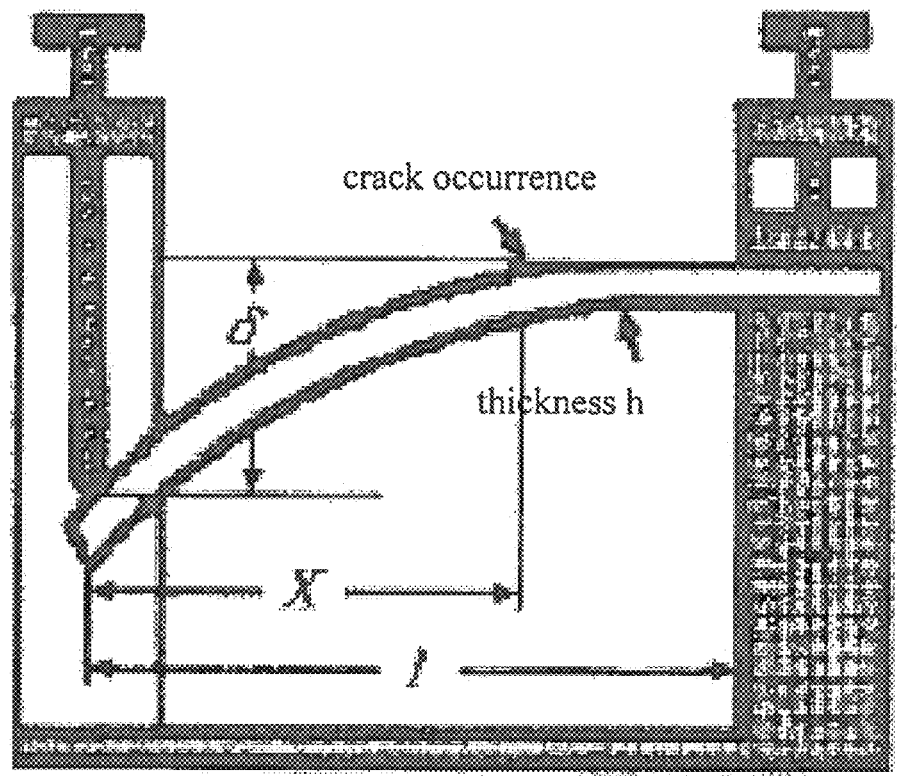

POLYCARBONATE RESIN COMPOSITION

TECHNICAL FIELD

The present invention relates to a polycarbonate resin composition, and more particularly, a polycarbonate resin composition which has improved chemical resistance and solvent resistance while retaining, the characteristics of polycarbonate resin of impact resistance, heat resistance, thermal stability and so forth.

BACKGROUND OF INVENTION

Polycarbonate resin is a thermoplastic resin that has excellent impact resistance, heat resistance, thermal stability and so forth, and is widely used in the fields of electrical products. electronics, ITE, machinery, automobiles and so forth. However, problems such as cracking sometimes occur due to solvents or various chemicals such as hand creams and detergents adhering to molded products obtained from polycarbonate resin, and a polycarbonate resin having excellent chemical resistance and solvent resistance is desired so that these problems do not occur. On the other hand, the alkyl ketene dimers used in the present invention are well known in the paper manufacturing industry as neutral sizing agents that prevent bleeding of ink Japanese Unexamined Patent Application Publication No. 2004-225212 incorporated herein by reference in its entirety for all purposes, and they bond with cellulose at the papermaking stage to produce a sizing effect. In applications other than paper, for example, reinforcing materials such as calcium carbonate used in resin is surface-treated with alkyl ketene dimers Japanese Unexamined Patent Application Publication No, H6-107939 incorporated herein by reference in its entirety for all purposes. It is also known that the hydrolysis resistance and thermal stability of polycarbonate resin can be improved by blending certain phosphorus compounds in polycarbonate resin Japanese Unexamined Patent Application Publication No 2002-69285 incorporated herein by reference in its entirety for all purposes. Additionally, it is known that the rubber-reinforced styrene resin used in the present invention can improve moldability and impact strength of polycarbonate resin when blended in polycarbonate resin Japanese Unexamined Patent Application Publication No. S38-15225 and Japanese Unexamined Patent Application Public won No. H4-110345 incorporated herein by reference in their entirety for all purposes An objective of the present invention is to provide a polycarbonate resin that has improved chemical resistance and solvent resistance as well as hydrolysis resistance while retaining the original characteristics of polycarbonate resin of impact resistance, heat resistance, thermal stability and so forth. Furthermore, rubber-reinforced styrene resin is sometimes blended in polycarbonate resin to improve the moldability and impact strength of the polycarbonate resin. When paint is applied to a molded product obtained from such blends, problems such as cracking due to chemicals and solvents such as thinners used in paint sometimes occur, and a resin composition made of a blend having excellent chemical resistance and solvent resistance is desired so that these problems do not occur, Another objective of the present invention is to provide a resin composition made of a polycarbonate resin/rubber-reinforced styrene resin having excellent chemical resistance and solvent resistance.

SUMMARY OF THE INVENTION

It has been discovered that chemical resistance and solvent resistance can be improved by blending certain alkyl ketene dimers in polycarbonate resin, and thereby achieved the present invention.

That is, the present invention is a polycarbonate resin composition comprising 100 parts by weight of a polycarbonate resin (A) and 0.01-20 parts by weight of an alkyl ketene dimer (B) represented by General formula 1:

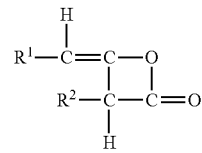

wherein $R^1$ and $R^2$ each independently represent an alkyl group having 6-33 carbons.

The polycarbonate resin composition of the present invention has improved chemical resistance and solvent resistance while retaining the original properties of polycarbonate resin of impact resistance, heat resistance, thermal stability and so forth, and it suppresses the occurrence of problems such as cracking even if solvents and various chemicals such as hand creams and detergents adhere to a molded product obtained from this resin composition.

BRIEF DESCRIPTION OF FIGURE

FIG. 1 shows a cantilever chemical resistance test jig Used to perform testing in the Examples

DETAILED DESCRIPTION OF THE INVENTION

Polycarbonate resin (A) used in the present invention is a polymer obtained by the phosgene technique, in which various dihydroxydiaryl compounds and phosgene are reacted, or by the ester exchange technique, in which a dihydroxydiaryl compound and a carbonate such as diphenyl carbonate are reacted, A typical polycarbonate resin is that produced from 2,2-bis(4-hydroxyphenyl)propane (common name: bisphenol A).

Examples of the aforementioned dihydroxydiaryl compound include, in addition to bisphenol A, bis(hydroxyaryl)alkanes like bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl) phenylmethane, 2,2-bis(4-hydroxyphenyl-3-methylphenyl) propane, 1,1-bis(4-hydroxy-3-tertiary butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane; bis(hydroxyaryl)cycloalkanes like 1,1-bis(4-hydroxyphenyl)cyclopentane and 1,1-bis(4-hydroxyphenyl)cyclohexane; dihydroxydiaryl ethers like 4,4'-dihydroxy diphenyl ether and 4,4'-dihydroxy-3,3'-dimethyl diphenyl ether; dihydroxydiaryl sulfides like 4,4'-dihydroxy diphenyl sulfide; dihydroxydiaryl sulfoxides like 4,4'-dihydroxy diphenyl sulfoxide and 4,4-dihydroxy-3,3'-dimethyl diphenyl sulfoxide; and dihydroxydiaryl sulfones like 4,4'-dihydroxy diphenyl sulfone and 4,4'-dihydroxy-3,3'-dimethyl diphenyl sulfone. These may be used singly or in a mixture of two or more types, but additionally, piperazine, dipiperidyl hydroquinone, resorcin, 4,4'-dihydroxydiphenyl and so forth may be used in a mixture.

Additionally, the aforementioned dihydroxyaryl compounds and the trivalent and higher phenol compounds shown below may be used as a mixture. Examples of trivalent and higher phenols include phloroglucin, 4,6-dimethyl-2,4,6-tri-(4-hydroxyphenyl)-heptene, 2,4,6-dimethyl-2,4,6-tri-(4-hydroxyphenyl)-heptane, 1,3,5-tri-(4-hydoxyphenyl)-benzole, 1,1,1-tri-(4-hydroxyphenyl)-ethane and 2,2-bis-[4,4-(4,4'-dihydroxydiphenyl)-cyclohexyl]-propane.

The viscosity-average molecular weight of polycarbonate resin (A) is not particularly limited, but from the viewpoints of moldability and strength, it is normally in the range of 10,000-100,000, preferably 14,000-30,000, and more preferably 16,000-26,000. Furthermore, molecular weight modifiers, catalysts and so forth may be used as necessary when producing such a polycarbonate resin.

Alkyl ketene dimer (B) used in the present invention is a compound represented by General formula 1:

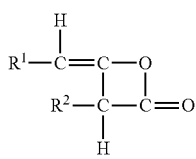

In general formula 1, $R^1$ and $R^2$ each independently represent an alkyl group having 6-33 carbons, and preferably an alkyl group having 10-21 carbons.

Examples of rubber-reinforced styrene resin (C) used in the present invention include acrylonitrile-butadiene-styrene copolymer (ABS resin), high-impact-polystyrene resin (HIPS) and methylmethacrylate-butadiene-styrene copolymer (NIBS resin). Preferred examples of rubber-reinforced styrene resin (C) are those that contain a graft copolymer obtained by graft copolymerization of an aromatic vinyl monomer and a vinyl cyanide monomer component in the presence of a rubber-like polymer. A particularly preferred substance is ABS resin produced by bulk polymerization.

Phosphorus-based antioxidant (D) used in the present invention is one or two or more compounds selected from compounds represented by general formulas 2 through 4 (D-1 through D-3) below.

General formula 2:

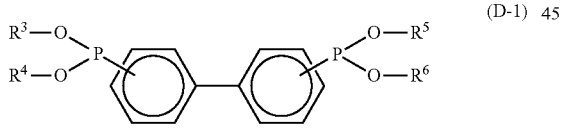

In general formula 2, $R^3$ through $R^6$ each independently represent an alkyl group having 1-20 carbons, or an aryl group optionally substituted with an alkyl group.

General formula 3:

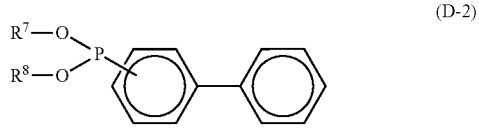

In general formula 3, $R^7$ and $R^8$ each independently represent an alkyl group having 1-20 carbons, or an aryl group optionally substituted with an alkyl group.

General formula 4:

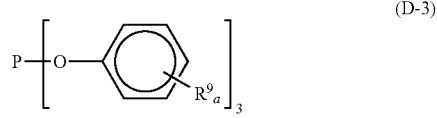

In general formula 4, $R^9$ represents an alkyl group having 1-20 carbons, or an aryl group optionally substituted with an alkyl group; a represents an integer from 0 to 3. As compound D-3, tris(2,4-di-t-butylphenyl)phosphite, which is commercially available as Irgafos P168 made by Ciba Specialty Chemicals, may be advantageously used. As a mixture of compounds D-1 through D-3, Sandostab P-EPQ made by Clariant Japan, having a main ingredient of tetrakis(2,4-di-t-butylphenyl)-4,4'-biphenylene phosphonite, is commercially available and may be advantageously used.

The blended quantity of alkyl ketene dimer (B) in the polycarbonate resin composition of the present invention is 0.01-20 parts by weight for 100 parts by weight of polycarbonate resin (A). If it is less than 0.01 parts by weight, it is undesirable because chemical resistance and solvent resistance are poor, and if greater than 20 parts by weight, it is undesirable because granulation processing becomes difficult and pellets of the resin composition cannot be obtained. The preferred blended quantity is 0.01-10 parts by weight, and 0.3-5 parts by weight is even more preferable. The blended quantity of rubber-reinforced styrene resin (C) is 5-60 wt % of the total quantity of polycarbonate resin (A) and rubber-reinforced styrene resin (C). If this blended quantity is less than 5%, it is undesirable because moldability is poor, and if greater than 60 wt %, it is undesirable because heat resistance decreases. The preferred blended quantity is 10-50 wt %, and 30-50 wt % is even more preferable. The blended quantity of phosphorus-based antioxidant (D) is preferably 0.006-0.12 parts by weight for 100 parts by weight of polycarbonate resin (A), if it is less than 0.006 parts by weight, it is undesirable because thermal stability and hydrolysis resistance are poor, and if greater than 0.12 parts by weight, it is undesirable because hydrolysis resistance is poor. The preferred blended quantity is 0.01-0.1 parts by weight, and 0.06-0.1 parts by weight is even more preferable.

The method for blending the various blended components (A) through (D) of the present invention is not particularly limited. They can be mixed using any mixer, such as a tumbler, ribbon blender, high-speed mixer or the like, or they can be melt-kneaded with an ordinary uniaxial or biaxial extruder. Furthermore, the order of blending of these blended components is not particularly limited, nor is the use of batch mixing or divided mixing. When mixing, other known additives, such as mold release agents, UV absorbents, antistatic agents, antioxidants, thermal stabilizers, dyes and pigments, spreading agents (epoxy soy bean oil, liquid paraffin, etc.), reinforcing materials (glass fibers, carbon fibers, talc, mica, etc.), or other resins, may be blended as necessary. Examples of UV absorbents include various UV absorbents that are benzotriazole-based, triazine-based or benzophenone-based compounds. One type may be used or two or More types may be used together. Above all, benzotriazole-based compounds may be advantageously used. The blended quantity of UV absorbent is preferably 0.05-3 parts by weight for 100 parts by weight of polycarbonate resin (A).

EXAMPLES

The present invention will be exemplified in examples below, but the examples are not intended to limit the present invention. Note that parts and percentages are by weight unless otherwise specified.

The blended components used are as follows.
(1) Polycarbonate Resin (A):
Polycarbonate resin synthesized from bisphenol A and phosgene (Calibre 200-20 made by Sumika Styron Polycarbonate; viscosity-average molecular weight: 19,000; called "PC" hereinafter)
(2) Polybutyl Terephthalate Resin:
600 FP made by Polyplastics (called "PBT" hereinafter)
(3) Alkyl Ketene Dimer
AKD 1840 made by Forever Chemical (called "AKD" hereinafter)
(4) Rubber-Reinforced Styrene Resin (C)
Bulk-polymerized ABS resin (Santac AT-05 made by Nippon A&L; rubber quantity: 20%; called "ABS" hereinafter)
  (5) Phosphorus-Based Antioxidant (D)
(i) Tris(2,4-di-t-butylphenyl)phosphite (Irgafos P168 made by Ciba Specialty Chemicals; called "P168" hereinafter)
(ii) Phosphorus-based antioxidant having a main ingredient of tetrakis(2,4-di-t-butylphenyl)-4,4'-biphenylene phosphonite (Sandostab P-EPQ made by Clariant Japan; called "P-EPQ" hereinafter)
(6) Phosphorus-based antioxidants other than phosphorus-based antioxidant (D):
(i) Bis(2,6-di-t-butyl-4-methylphenyl)pentaerythritol phosphite (ADK STAB PEP36 made by ADEKA; called "AO1" hereinafter)
(ii) 6-[3-(3-methyl-4-hydroxy-5 -t-butylphenyl)propox]-2,4,8,10-tetra-t-butyl-dibenzo[d,f][1,3,2] dioxaphosphepin (Sumilizer GP made by Sumitomo Chemical; called "AO2" hereinafter)
(7) UV absorbent:
Benzotriazole-based UV absorbent: 2,2'-methylenebis[6-(2H-benzotriazol-2-yl) 4-(1,1,3,3-tetramethylbutyl)phenol] (LA-31 made by ADEKA Corporation; called "UVA" hereinafter)

The various blended components described above were put all at once in a tumbler in the blending ratios shown in Tables 1-3 and 5, and after being dry-mixed for 10 minutes, they were kneaded at a melt temperature of 280° C. using a biaxial extruder (KTX37 made by Kobe Steel), and pellets of the polycarbonate resin compositions (called "PC resin compositions" hereinafter) were obtained. For the PC resin compositions containing rubber-reinforced styrene resin (blending ratios shown in Table 4), pellets of the PC resin composition were obtained in the same manner except that the melt temperature was set to 240° C.
The obtained PC resin compositions were evaluated as follows.
  Evaluation of Chemical Resistance
Except for the PC resin compositions containing rubber-reinforced styrene resin (blending, ratios shown in Table 4), pellets of the PC resin compositions were dried for 4 hours at 125° C., and then test pieces (127×13×12 mm) were made at an injection pressure of 1600 kg/cm² using an injection molder (J-100E-C5 made by Japan Steel Works) at a set temperature of 280° C.
Strain was applied to the obtained test pieces using a cantilever chemical resistance test jig (illustrated below), and the centers of the test pieces were coated with the following chemicals.
Chemicals Used in Evaluation:
(i) Magiclean made by Kao (main ingredient: alkyl amine oxide I% aqueous solution) (called "C1" hereinafter)
(ii) Nivea cream made by Nivea-Kao (main ingredients; water, mineral oil petroleum jelly, hydrogenated polyisobutene, lanolin alcohol) (called "C2" hereinafter)

After the above chemicals were applied, the test pieces were left to stand for 48 hours in a 23° C. or 85° C. atmosphere, and critical strain ∈ (%) was determined from the generation of cracks (cracks or cervices) on the test pieces using equation (1).

[Equation 1]

$$\varepsilon = \frac{3}{2} \cdot \frac{h\delta X}{l^3} \times 100 (\%) \quad (1)$$

Here,
∈: strain
h: test piece thickness
δ: maximum deflection
X: distance from maximum deflection point
l: span
Chemical resistance was judged according to the following standards from the critical strain determined by the equation above. Critical strain is preferably at least 0.7% (good to excellent).
Chemical resistance judgment:
Excellent: Critical strain is at least 1.0%
Good: Critical strain is at least. 0.7% and less than 1.0%
Possible: Critical strain is at least 0.5% and less than 0.7%
Impossible: Critical strain is at least 0.3% and less than 0.5%
Very impossible: Critical strain is less than 0.3%
  Furthermore, for the PC resin compositions containing rubber-reinforced styrene resin (blending ratios shown in Table 4), test pieces (127×13×12 mm) were made in the same manner except that the drying temperature was 100° C. and the set temperature of the injection molder was 250° C. Strain of 0.3% (Equation 1) was applied to the obtained test pieces using a cantilever chemical resistance test jig, and the centers of the test pieces were coated with the following chemicals.
Solvent Used in Evaluation:
No. 5700 thinner made by Ohashi Chemical Industries main ingredients: toluene, ethyl acetate, 1-butanol) (called "C3" hereinafter)
After the above solvent was applied, the test pieces were left to stand for 72 hours in a 23° C. atmosphere and were then bent by hand, and it was evaluated whether cracking occurred (impossible) or did not occur (good). Cracking preferably does not occur (good).
  Evaluation of Transparency
Except for the PC resin compositions containing rubber-reinforced styrene resin (blending ratios shown in Table 4), pellets of the PC resin compositions were dried for 4 hours at 125° C., and then test pieces (150×90×3.0 mm) were made at an injection pressure of 1600 kg/cm² using an injection molder (J-100E-05 made by Japan Steel Works) at a set temperature of 280° C. Light transmittance was measured according to JIS K7361 using the obtained test pieces. Light transmittance is preferably at least 80%.
  Evaluation of Notched Charpy Impact Strength and Deflection Temperature Under Load
Except for the PC resin compositions containing rubber-reinforced styrene resin (blending ratios shown in Table 4), pellets of the PC resin compositions were dried for 4 hours at 125° C., and then test pieces conforming to ISO test methods were made at an injection pressure of 1600 kg/cm² using an injection molder (J-100E-05 made by Japan Steel Works) at a set temperature of 280° C. Using the obtained test pieces, notched Charpy impact strength and deflection temperature under load were measured based on ISO 179-1 and ISO 75-2.

Notched Charpy impact strength is preferably at least 10 KJ/m$^2$, and deflection temperature under load is preferably at least 105° C. For the PC resin compositions containing rubber-reinforced styrene resin (blending ratios shown in Table 4), deflection temperature under load was measured in the same manner except that the drying temperature was 100° C. and the set temperature of the injection molder was 250° C. Deflection temperature under load is preferably at least 95° C.

Evaluation of Moldability

Pellets of the PC resin compositions were dried for 4 hours at 100° C., and then flow length was measured using an Archimedes spiral flow die (width 10 mm. thickness 1.0 mm) at an injection pressure of 1600 kg/cm$^2$ using an injection molder (J-100E-C5 made by Japan Steel Works) at a set temperature of 250° C. The spiral flow length is preferably at least 110 mm.

Evaluation of Hydrolysis Resistance

Pellets of the PC resin compositions were dried for 4 hours at 125° C., and then test pieces for transparency evaluation (150×90×3.0 mm) were made at an injection pressure of 1600 kg/cm$^2$ using an injection molder (J-100E-05 made by Japan Steel Works) at a set temperature of 280° Ck hydrolysis test was performed on the obtained test pieces using a hydrolysis tester (HAST System TPC-412M made by Tabai Espec) at 125° C., 100% RH for 48 hours, and the transparency of the test pieces was evaluated visually. Transparency is preferred, and test pieces exhibiting a frosted, cloudy or opaque appearance or test pieces that dissolve are undesirable.

Evaluation of Weather Resistance

Pellets of the PC resin compositions were dried for 4 hours at 125° C., and then test pieces for weather resistance evaluation (150×90×2.0 mm) were made at an injection pressure of 1600 kg/cm$^2$ using an injection molder (J-100E-05 made by Japan Steel Works) at a set temperature of 280° C. The obtained test pieces were placed in an accelerated weathering machine (Super Xenon Weather Meter SX75 made by Suga Test Instruments), and irradiation was performed at 150 W/m for 300 hours under rain-free conditions. After that, YI of the test pieces was measured after irradiation, and ΔY (difference in YI) was determined. The value of ΔYI, which indicates the degree of discoloration, is preferably less than 12.0.

Results are shown in the tables below.

TABLE 1

|  | Example |  |  | Comparative example |  |  |  |
| --- | --- | --- | --- | --- | --- | --- | --- |
|  | 1 | 2 | 3 | 1 | 2 | 3 | 4 |
| PC (parts) | 100 | 100 | 100 | 100 | 100 | 80 | 100 |
| PBT (parts) | — | — | — | — | — | 20 | — |
| AKD (parts) | 0.2 | 5 | 10 | — | 0.005 | — | 25 |
| AO1 (parts) | 0.04 | 0.04 | 0.04 | 0.04 | 0.04 | 0.04 | 0.04 |
| Chemical resistance 23° C. Chemical: C1 | Excellent | Good | Good | Possible | Possible | Impossible | Pellets could not be made because granulation processing was difficult |
| Chemical resistance 85° C. Chemical: C2 | Excellent | Good | Good | Possible | Possible | Good |  |
| Light transmittance (%) | 90 | 86 | 82 | 90 | 90 | 68 |  |
| Notched Charpy impact strength (KJ/m$^2$) | 60 | 57 | 12 | 60 | 59 | 8 |  |
| Deflection temperature under load (° C.) | 123 | 110 | 106 | 126 | 125 | 100 |  |

TABLE 2

|  | Example |  |  |  |  |  |  |  |  |  |
| --- | --- | --- | --- | --- | --- | --- | --- | --- | --- | --- |
|  | 4 | 5 | 6 | 7 | 8 | 9 | 10 | 11 | 12 | 13 |
| PC (parts) | 100 | 100 | 100 | 100 | 100 | 100 | 100 | 100 | 100 | 100 |
| PBT (parts) | — | — | — | — | — | — | — | — | — | — |
| AKD (parts) | 0.2 | 0.2 | 0.2 | 0.2 | 5 | 5 | 5 | 5 | 10 | 10 |
| P-EPQ (parts) | 0.01 | 0.03 | 0.06 | 0.1 | 0.01 | — | 0.06 | 0.1 | 0.01 | 0.03 |
| P168 (parts) | — | 0.03 | — | — | — | 0.06 | — | — | — | 0.03 |
| Chemical resistance 23° C. Chemical: C1 | Excellent | Excellent | Excellent | Excellent | Good | Good | Good | Good | Good | Good |
| Chemical resistance 85° C. Chemical: C2 | Excellent | Excellent | Excellent | Excellent | Good | Good | Good | Good | Good | Good |
| Light transmittance (%) | 90 | 89 | 90 | 90 | 85 | 86 | 86 | 84 | 80 | 81 |
| Notched Charpy impact strength (KJ/m$^2$) | 60 | 58 | 61 | 59 | 56 | 57 | 57 | 55 | 13 | 11 |
| Deflection temperature under load (° C.) | 123 | 123 | 122 | 123 | 112 | 110 | 111 | 111 | 105 | 107 |
| Hydrolysis resistance | Transparent | Transparent | Transparent | Transparent | Transparent | Transparent | Transparent | Transparent | Transparent | Transparent |

TABLE 3

| | Example | | | | | Comparative example | | | |
|---|---|---|---|---|---|---|---|---|---|
| | 14 | 15 | 16 | 17 | 18 | 5 | 6 | 7 | 8 |
| PC (parts) | 100 | 100 | 100 | 100 | 100 | 100 | 100 | 80 | 100 |
| PBT (parts) | — | — | — | — | — | — | — | 20 | — |
| AKD (parts) | 10 | 10 | 0.2 | 0.2 | 0.2 | — | 0.005 | — | 25 |
| P-EPQ (parts) | 0.06 | 0.1 | 0.003 | 0.2 | — | 0.06 | 0.06 | 0.06 | 0.06 |
| AO1 (parts) | — | — | — | — | 0.06 | — | — | — | — |
| Chemical resistance 23° C. Chemical: C1 | Good | Good | Excellent | Excellent | Excellent | Possible | Possible | Impossible | Pellets could not be made because granulation processing was difficult |
| Chemical resistance 85° C. Chemical: C2 | Good | Good | Excellent | Excellent | Excellent | Possible | Possible | Good | |
| Light transmittance (%) | 82 | 82 | 90 | 88 | 89 | 90 | 90 | 68 | |
| Notched Charpy impact strength (KJ/m$^2$) | 12 | 12 | 60 | 55 | 59 | 60 | 59 | 8 | |
| Deflection temperature under load (° C.) | 106 | 106 | 123 | 122 | 122 | 126 | 125 | 100 | |
| Hydrolysis resistance | Transparent | Transparent | Cloudy | Dissolved | Cloudy | Transparent | Transparent | Cloudy | |

TABLE 4

| | Example | | | | | | | | Comparative example |
|---|---|---|---|---|---|---|---|---|---|
| | 19 | 20 | 21 | 22 | 23 | 24 | 25 | 9 | 10 |
| PC (parts) | 90 | 70 | 70 | 70 | 50 | 100 | 30 | 90 | 60 |
| ABS (parts) | 10 | 30 | 30 | 30 | 50 | — | 70 | 10 | 40 |
| AKD (parts) | 5 | 0.2 | 5 | 10 | 5 | 0.2 | 0.2 | — | 25 |
| AO2 (parts) | 0.04 | 0.04 | 0.04 | 0.04 | 0.04 | 0.04 | 0.04 | 0.04 | 0.04 |
| Chemical resistance 23° C. Chemical: C3 | Good | Good | Good | Good | Good | Good | Good | Impossible | Pellets could not be made because granulation processing was difficult |
| Deflection temperature under load (° C.) | 120 | 110 | 110 | 110 | 100 | 126 | 90 | 120 | |
| Moldability: Spiral flow length (mm) | 125 | 175 | 175 | 175 | 225 | 100 | 275 | 125 | |

TABLE 5

| | Example | | |
|---|---|---|---|
| | 26 | 27 | 28 |
| PC (parts) | 100 | 100 | 100 |
| AKD (parts) | 0.2 | 5 | 10 |
| AO1 (parts) | 0.04 | 0.04 | 0.04 |
| UVA (parts) | 0.2 | 0.5 | 2 |
| Chemical resistance 23° C. Chemical: C1 | Excellent | Good | Good |
| Chemical resistance 85° C. Chemical: C2 | Excellent | Good | Good |
| Light transmittance (%) | 90 | 85 | 80 |
| Notched Charpy impact strength (KJ/m$^2$) | 60 | 57 | 12 |
| Weather resistance (ΔYI) | 11 | 8 | 4 |

The cases in which the polycarbonate resin composition satisfied the constituent elements of the present invention (examples) exhibited good results for chemical resistance, solvent resistance, impact strength and heat resistance.

What is claimed is:

1. A polycarbonate resin composition comprising 100 parts by weight of a polycarbonate resin (A) and 0.01-20 parts by weight of an alkyl ketene dimer (B) represented by General formula 1:

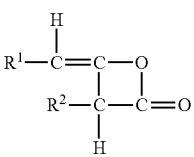

wherein $R^1$ and $R^2$ each independently represent an alkyl group having 6-33 carbons.

2. The resin composition of claim 1, wherein the blended quantity of the alkyl ketene dimer (B) is 0.03-5 parts by weight.

3. The resin composition of claim 1, further comprising a rubber-reinforced styrene resin (C), wherein the rubber-reinforced styrene resin (C) is contained in an amount of 5-60 wt % of the total amount of the polycarbonate resin (A) and the rubber-reinforced styrene resin (C).

4. The resin composition of claim 3, wherein the rubber-reinforced styrene resin (C) is ABS resin.

5. The resin composition of claim 1, further comprising at least one phosphorus-based antioxidant (D) selected from compounds represented by general formulas 2 through 4 below in an amount of 0.006-0.12 parts by weight:

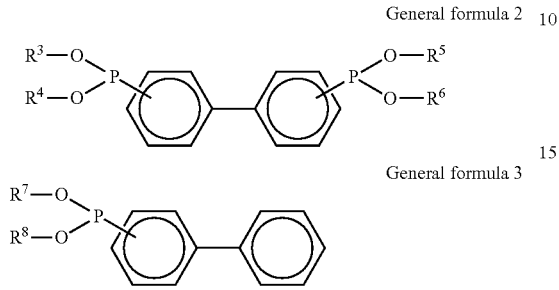

General formula 2

General formula 3

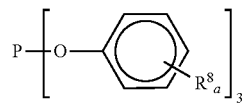

General formula 4 wherein; $R^3$ through $R^6$ each independently represent an alkyl group having 1-20 carbons, or an aryl group optionally substituted with an alkyl group;

$R^7$ and $R^8$ each independently represent an alkyl group having 1-20 carbons, or an aryl group optionally substituted with an alkyl group;

$R^9$ represents an alkyl group having 1-20 carbons, or an aryl group optionally substituted with an alkyl group; and a represents an integer from 0 to 3.

6. The resin composition of claim 5, wherein the compounded quantity of the phosphorus-based antioxidant (D) is 0.01-0.1 parts by weight.

* * * * *